March 19, 1968
R. E. FORREN
3,373,514
CONVERSION UNIT FOR ROTARY MOWERS
Filed March 17, 1965
2 Sheets-Sheet 1
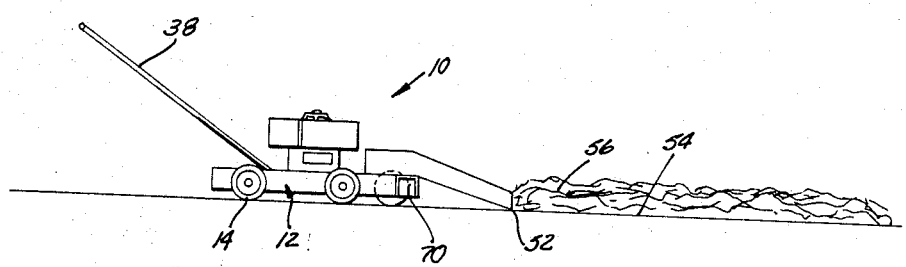
FIG. 1.
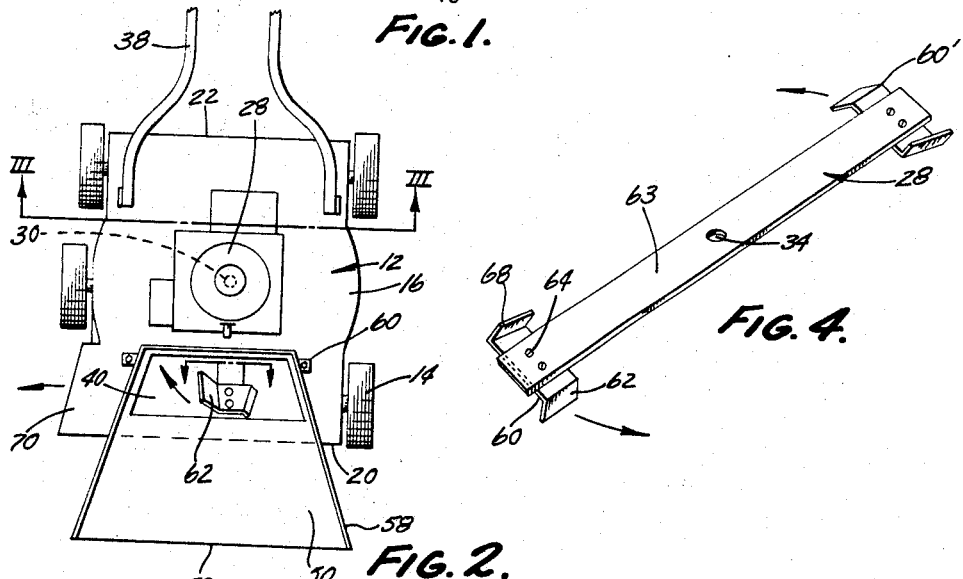
FIG. 2.
FIG. 4.
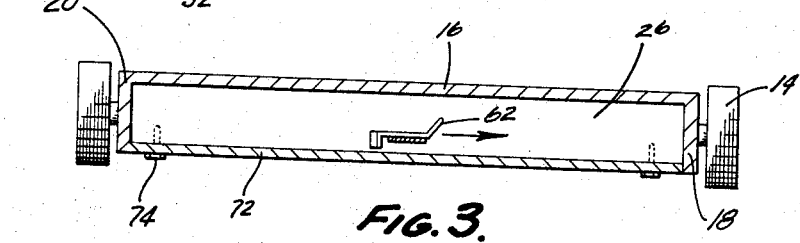
FIG. 3.
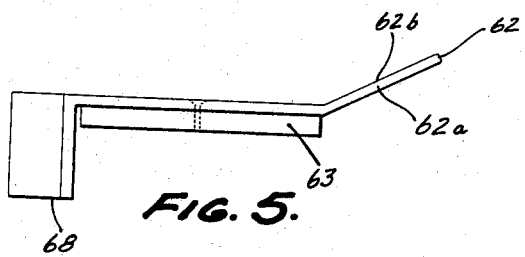
FIG. 5.
INVENTOR.
RICHARD E. FORREN
BY
ATTORNEYS March 19, 1968   R. E. FORREN   3,373,514
CONVERSION UNIT FOR ROTARY MOWERS
Filed March 17, 1965

INVENTOR.
RICHARD E. FORREN
BY
ATTORNEYS

United States Patent Office 3,373,514
Patented Mar. 19, 1968

3,373,514
CONVERSION UNIT FOR ROTARY MOWERS
Richard E. Forren, 972 Fairwood Ave.,
Marion, Ohio 43302
Filed Mar. 17, 1965, Ser. No. 440,435
3 Claims. (Cl. 37—43)

ABSTRACT OF THE DISCLOSURE

A converted lawn mower snow removal apparatus having a snow ramp, and having vertically extending, plow type snow thrower elements and also suction forming sweep elements on the blades.

---

This invention relates to rotary machines for removing snow, leaves, dirt, etc., particularly snow, and more particularly relates to a converted rotary lawn mower with special attachment means.

The concept of employing a rotary lawn mower for snow removal during winter season has been taught in recent years in several different patents and other publications. The devices conceived for this purpose operate largely on the principle of delivering snow to the revolving blade from the underside of the mower housing by pushing the mower over the top of the snow, and using special plow type attachments on the revolving mower blade to throw the snow aside. However, since the mower housing is only about four to six inches above the ground, normally, and since in fact, the lower edge of the housing is usually only about an inch above the ground, these prior type units can only operate effectively with very small depths of snow. If the snow becomes a couple of inches or more deep, the mower cannot be conveniently pushed up over it to get the snow to the bottom side of the housing and to the blade. Even if the mower is pushed over this deeper snow, the mower tends to sink down into the snow so that the housing seals off the area around it to prevent effective discharge and operation of the blade.

Hence, although the basic concept of using a rotary mower as a snow removal unit is advantageous, known devices are largely ineffective for snow of any significant amount. They can discharge the snow once it is inside the housing, but they have a poor, inefficient in-feed to the housing to enable action on the snow by the blade. These units, therefore, have not been adopted commercially to any considerable extent.

It is an object of this invention to provide a converted rotary mower, material removal apparatus that can handle snow or leaves of considerable depth due to a unique arrangement of attachment parts to achieve different in-feed and handling.

Another object of this invention is to provide a removal apparatus that employs a unique feed and handling system to get the snow into the housing where it can be acted upon by the blade, and not limited to feed through the housing underside. The apparatus has a special top feed system enabling snow of considerable depth to be handled while the unit remains solidly on the ground.

Another object of this invention is to provide a snow removal apparatus with an in-feed system that employs a drawing or suction action to obtain most effective feed into the housing.

Still another object of this invention is to provide a unique blade attachment and resulting blade assembly for a mower type, revolving blade unit to obtain effective in-feed of snow, etc., to the housing, as well as excellent discharge from it.

Another object of this invention is to provide removal apparatus convertible from a rotary lawn mower, and yet allowing reuse of the rotary lawn mower by removal of attachments. Furthermore, the attachments can be substituted one for another for snow removal, leaf sweeping of lawns, and even vacuum sweeping.

Another object of this invention is to provide a removal apparatus converted from a rotary lawn mower, and capable of multiple usage with a minimum of adaptation operations.

These and several other objects of this invention will become apparent upon studying the following specification in conjunction with the drawings in which:

FIG. 1 is a side elevational view of the novel unit showing its use for removing snow from a surface;

FIG. 2 is a plan view of the apparatus in FIG. 1;

FIG. 3 is a sectional view taken on plane III—III of FIG. 2;

FIG. 4 is a perspective enlarged view of the bottom side of the blade assembly used in the apparatus;

FIG. 5 is a sectional view of the blade assembly taken on plane V—V of FIG. 2;

Figure 6:
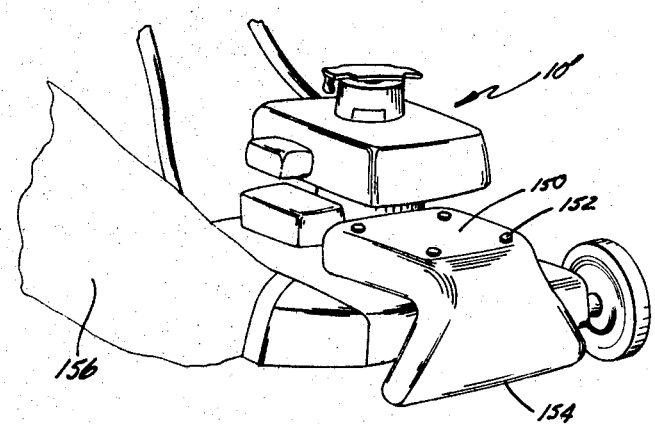
FIG. 6 is a perspective view of the novel unit shown in its second form.

Referring basically to the drawings, the complete assembly 10 in FIG. 1 includes a basic housing 12 having a plurality of wheels 14 rollably mounted on opposite side walls thereof. Instead of wheels, other ground contact support means may be used, such as small skis or flexible tracks. This metallic housing is hollow, including an upper, generally horizontal, platform-type cover surface 16, a pair of side walls 18 and 20 to which wheels 14 are rotatably mounted, a front wall 20, and a rear wall 22, all integral with each other in conventional fashion. This housing forms an internal chamber 26 that contains the blade assembly 28.

Mounted on platform 16 of the housing is a typical internal combustion engine 28 to power the unit. It has a drive shaft 30 extending down through platform 16 into chamber 26 for mounting of the blade assembly 28 through its central opening 34. In the particular form of the device shown, a rearwardly, upwardly projecting handle assembly 38 is provided for steering and perhaps pushing the device along the ground. It will be realized that the unit may be power driven along the ground instead of the push type. It may even be a riding type unit if desired. These alternatives have no effect on the invention and hence, are not shown in the drawings.

In the top surface 16 of the housing, forwardly of the drive engine, and just behind and adjacent front wall 20 of the housing, is an inlet opening 40 of substantial width and breadth. Cooperative with this opening, in the first form of the invention illustrated in FIGS. 1 and 2, is a material advancing means which comprises a scoop shaped, diagonally downwardly and forwardly oriented ramp 50. This ramp has a substantial area with a front edge 52 that extends to a position immediately adjacent the snow covered support surface 54 over which the unit is being pushed. The ramp surface has along its sides and the back a retention rim 58 to guide scooped material up over the surface to the receiving inlet opening 40. This scoop may be mounted to the housing over the opening by use of suitable bolts and mounting flange wings 60 on the sides of the unit, or alternately may be attached by a sliding flange and slot connection. The attachment unit removable to enable the mower to later be used for its typical lawn mowing function. When removed, a plain cover plate can be attached over the inlet opening 40.

The blade assembly 28 may be formed specially and substituted on the drive shaft for the usual grass cutting blade which has substantially the same size, or alternatively, the blade assembly may be formed from the lawn cutting blade by having a pair of openings in each end of the cutting blade for attachment of special, generally Z-shaped units 60 and 60' at opposite ends. These units have a double function. Each has a central portion mounted to the elongated blade shaped mount 63 as by screws 64. Projecting from one end of this central portion in an upwardly and forwardly diagonal relation with respect to the direction of blade movement, is a first end flange 62. This flange element is spaced from the drive shaft or center of the blade the same amount that opening 40 is spaced therefrom, to be coincident. Thus, as the blade rotates, this sweep element 62 will sweep past inlet opening 40 with considerable speed and at high frequency. The result is the forced suction action on the snow over the inlet opening. In the form shown, this element 62 has a width substantially smaller than the breadth of opening 40 from front to back, and has a substantial clearance from the upper platform and this opening as seen in FIG. 3. However, if a stronger evacuating action is desired, this element need only be made wider to cover more of opening 40 as it passes, and longer to have a smaller clearance from the opening. The angle of this element is preferably about 45° for optimum sweep-drawing action.

On the opposite end of each of the units 60 and 60' is a downwardly depending, plow type, snow-throwing flange element. This element is in a vertical plane which is at a small acute angle with respect to the main longitudinal axis along the blade shaped support 63. This angle is about 10°–15° to obtain the maximum throwing action when ejecting material from the housing out the tangentially oriented discharge side outlet 70.

The drawing or suction action of the blade assembly is improved by closing off the normally open bottom of chamber 26 with a cover plate 72. It is mounted to the housing as by being secured to the front and back walls with suitable bolts 74 or other equivalent means. This encloses chamber 26 except for inlet 40 and discharge outlet 70. This accentuates the suction action on the receiving opening 40, and intensifies and concentrates the flow stream pattern directly between the inlet and outlet.

In operation, as the unit is moved forwardly on support surface 54, either under powered action or manually, either on wheels or skis, snow 56 is scooped up ramp 50 and over inlet opening 40. The snow drops into, and is pulled down into internal chamber 26 through inlet opening 40 by the highly revolving suction forming sweep element 62 constantly passing this opening. As snow is swept down into the chamber along the underside 62a of element 62 and up against the surface of plow element 68, it is thrown tangentially out the discharge opening 70 as the plow moves past opening 70. Simultaneously, passing of element 62 causes turbulence along the backside 62b of this element to create a continuous vacuum on the snow to draw more snow in as the blade passes. There snow drops into the housing behind the blade so that the second plow can scoop it up and throw it out discharge outlet 70.

Conceivably, a plurality of such blades could be used, if desired, to obtain constant drawing and discharging action. It will be realized that the in-feed problem existing with prior units is overcome by (1) feeding the snow into the top of the housing, and (2) by the drawing action of the blade element. It is also supplemented by the increased negative pressure in the housing due to closing off the bottom of the housing.

Also, within the broader aspects of this invention an integral disc having a plurality of scoop and discharge members 68 and 62 severed and bent therefrom around its periphery could be submitted for a plurality of blades.

In fact, utilizing this assembly, not only can snow be disposed of, but also other materials such as leaves. Referring to FIG. 6, in this second form of the inventive structure the complete assembly 10' instead of using the scoop element shown in FIGS. 1 and 2, has a closed conduit type feed in tube 150 mounted over opening 40 by a plurality of bolts 152. It extends forwardly and downwardly with the housing to have an intake opening mouth 154 spaced slightly above the support surface over which it is riding. Thus, as it moves over leaves, the leaves are sucked up into the unit and down into the top of chamber 26 by the revolving blade assembly illustrated in FIGS. 3, 4, and 5. They are discharged through outlet 70 into a receiving bag or suitable container 156 mounted over the discharge outlet.

Figure 7:
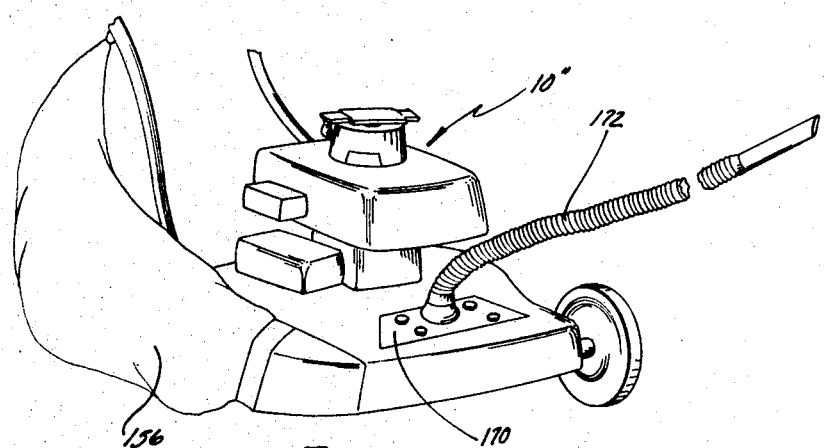
FIG. 7 is a perspective view of the novel unit shown in its third form.

With a slightly different adaptation, as shown in the third form of the assembly 10" in FIG. 7, not only can leaves be cleaned up and discharged into the receiving container 156, but also dirt and other material. This is achieved by mounting over the discharge opening a cover plate 170 which has attached thereto an elongated, flexible tube 172 similar to a typical vacuum cleaner hose. By operating the unit, the vacuum in this hose will enable various vacuum sweeping jobs to be done in cases where an electrical outlet is not convenient, for example. Typical uses are to clean an auto, a garage, etc.

It will be apparent upon studying the foregoing description and drawings that the particular attachments, together with the mower assembly to form the novel unit can be utilized not only for the main intended snow removal function, but also for these additional duties illustrated with respect to FIGS. 6 and 7.

Further, during the summer season, the scoop inlets of various type are merely removed for attachment of a cover plate over inlet opening 40 for use of the mower to cut grass. The blade is altered either by removing the entire assembly 28 in FIG. 4 and substituting a typical cutting blade, or by removing screws 64 and the attached elements.

Certain additional advantages to those specifically noted above may be apparent to those in the art upon studying these foregoing forms of the device. Also, it is conceivable that certain minor variations in construction details may be modified within the concept presented, to suit a particular type of mower, a particular type of drive arrangement, a particular type of function to be performed, and the like. Thus, the invention is intended to be limited only by the scope of the appended claims and the reasonably equivalent structures to those defined therein.

I claim:

1. A converted rotary mower snow removal apparatus comprising: a housing having front and back walls, a pair of side walls, and a top, all forming an inner chamber; wheels rollably mounted to said housing, and a power motor means mounted on said top, with its power shaft extending down into said chamber; a rotary blade means mounted to said shaft in said chamber, including vertically extending, plow type, snow thrower elements on extremities thereof; said housing having a discharge passage in one side wall; a receiving opening in said housing top into said chamber, adjacent said front wall; a snow ramp extending from said opening, forwardly and downwardly generally to the level of the bottom of the wheels; said blade means including suction forming sweep elements projecting diagonally upwardly from said blade and forwardly with respect to the direction of blade rotation, and coincident with said receiving opening to draw material down through said opening and into said chamber as said sweep elements sweep past said opening.

2. The apparatus in claim 1 wherein said thrower elements depend in a vertical plane which is at an acute angle to the main longitudinal axis of the blade means.

3. The apparatus in claim 1 wherein each of said sweep elements is integrally connected to one of said thrower elements, and is mounted to the ends of the rotating blade means.

(References on following page)

References Cited

UNITED STATES PATENTS

| | | | |
|---|---|---|---|
| 2,019,895 | 11/1935 | Dow | 15—350 |
| 3,103,077 | 9/1963 | Bennett | 37—45 |
| 3,123,962 | 3/1964 | Hester | 37—43 X |
| 3,142,913 | 8/1964 | Jacob | 37—43 |
| 3,286,376 | 11/1966 | Wildes | 37—43 |

ABRAHAM G. STONE, *Primary Examiner.*

R. L. HOLLISTER, *Assistant Examiner.*